United States Patent [19]

Johnson

[11] Patent Number: 5,111,735
[45] Date of Patent: May 12, 1992

[54] AIR SPRING WITH QUICK RELEASE VALVE

[75] Inventor: Noel R. Johnson, Janesville, Wis.

[73] Assignee: Beloit Corporation, Beloit, Wis.

[21] Appl. No.: 606,025

[22] Filed: Oct. 30, 1990

[51] Int. Cl.⁵ .............................................. F15B 11/10
[52] U.S. Cl. ........................................ 91/433; 91/442;
91/443; 91/454
[58] Field of Search .................. 91/418, 432, 433, 438,
91/442, 443, 444, 454; 92/34

[56] References Cited

U.S. PATENT DOCUMENTS

| | | |
|---|---|---|
| 2,848,980 | 8/1958 | Ayers, Jr. .............................. 91/433 |
| 2,956,797 | 10/1960 | Polhemus . |
| 3,010,715 | 11/1961 | Slemmons et al. . |
| 3,044,761 | 7/1962 | Davies . |
| 3,099,136 | 7/1963 | Carlson, Jr. ........................ 91/442 X |
| 4,232,514 | 11/1980 | Flatt .................................. 91/442 X |
| 4,633,761 | 1/1987 | Schweikert ............................ 91/443 |
| 4,638,837 | 1/1987 | Buike et al. ....................... 91/443 X |
| 4,838,156 | 6/1989 | Hafner et al. . |

*Primary Examiner*—Edward K. Look
*Assistant Examiner*—John Ryznic
*Attorney, Agent, or Firm*—Dirk J. Veneman; Raymond W. Campbell; Gerald A. Mathews

[57] ABSTRACT

An air spring apparatus has quick pressure release, and rapid air exhaust, capability by means of a relatively large diameter exhaust port in a larger, primary air spring which is controlled by the action of a smaller, secondary air spring. The secondary air spring is equipped with a check valve which controls the flow of air into the primary air spring. The rapid exhaust of the primary air spring is effected by triggering the removal of air pressure from the secondary air spring through a plurality of orifices in a centrally disposed guide tube which permits the collapse of the smaller air spring and the accompanying removal of a valve plate from a relatively large diameter exhaust port of the primary air spring. Once the exhaust port in the primary air spring has been opened, the air pressure in the primary air spring is immediately lowered, and the load on the larger air spring causes rapid expulsion of the volume of air in the primary air spring to permit its quick deflation and collapse to a predetermined minimum height.

5 Claims, 2 Drawing Sheets

AIR SPRING WITH QUICK RELEASE VALVE

BACKGROUND OF THE INVENTION

1. Field of the Invention

This invention relates to air springs, such as are used to load co-rotating rolls into nipping engagement on a papermaking machine. More specifically, this invention relates to an improved air spring having the capability of quickly releasing the air pressure and quickly exhausting the compressed volume of air within the air spring. Still more particularly, this invention relates to an air spring apparatus including a primary air spring having an enlarged exhaust port and a separate, secondary air spring which operates in conjunction with the primary air spring to control the opening and closing of its exhaust port to quickly shorten its effective stroke.

2. Description of the Prior Art

Air springs are well-known and are extensively utilized in many industries to provide resilient, or cushioned, load support and for providing substantial force to move or actuate components, such as pivoted lever arms, in machinery. Examples of the usage of air springs is in the suspension system on inter-city buses, long distance trucks, mining equipment, including vehicles, and in the roll actuation apparatus on papermaking machinery.

Specifically, in papermaking machinery, air springs are commonly used to actuate the lever arms used to bring rolls into co-running, nipping engagement to effect nip loads, for example, up to about 1,000 pli (pounds per linear inch) or about 178 Kg/cm. Air springs are versatile, powerful and have relatively short axial lengths. They are actuated by the application of air pressurized to relatively low pressures (60 psi/413,688 Pascals) which can be provided easily in most industrial, commercial and vehicular applications.

Even though the applications for air springs are almost endless, they have heretofore exhibited one major deficiency. Specifically, they have not been able to quickly collapse and quickly reduce their axial effective stroke or actuation distance. In some applications, this is not a troublesome characteristic, but in the case where they are used to load a roll couple, this operating characteristic can cause, or exacerbate, problems associated with the speed at which the nipped rolls are separated from one another to form a gap therebetween.

This operating deficiency has its basis in the fluid mechanics of pressurized air. When air is depressurized, the remaining volume does not inherently flow in the direction of the source of depressurization, such as a vent, without being forced out. Even under the force of the load, a relatively large volume of air will not pass through a relatively small orifice quickly. Thus, in prior air springs, when the exhaust port, which was usually a drilled hole, was opened, the air pressurization within the air spring was released virtually immediately, but the air spring would not collapse quickly, much less immediately, due to the fact that it remained substantially completely full of air. In other words, the movement of the air spring, and its opposed load plates, to a collapsed, or axially shortened position is not merely a function of the air pressure within the air spring, but of the volume of the air within the air spring in conjunction with the size of the exhaust port. The largest commonly available solenoid valves (for about a 5 cm diameter pipe) are inadequate.

Prior air springs were typically pressurized and exhausted through holes drilled in one of their outer plates. For unknown reasons, perhaps due to the need for continuous load bearing capability, such as in vehicular suspension systems, little or no capability was provided for air to be more rapidly introduced into the air spring and exhausted from it. However, as briefly mentioned above, in some applications in the papermaking industry, the necessity for quickly collapsing the air spring has been long sought. Indeed, in some applications, elaborate linkages have been devised to mechanically amplify both the relatively short stroke and to reduce the relatively long time required by the prior, standard air spring to collapse after the release of air pressure. Such apparatus is relatively complicated and expensive to manufacture, and do not represent a direct solution to the problem.

SUMMARY OF THE INVENTION

The shortcomings, deficiencies and inefficiencies of prior types of air springs have been obviated by this invention. In the apparatus of this invention, a relatively small, secondary air spring is utilized to control the relative position of a valve plate which, in turn, controls the air seal on an enlarged exhaust port in a relatively larger, primary air spring. The valve plate can, thus, be moved from a position where it effectively seals the pressurized air within the primary air spring to a position where it not only releases the pressure within the primary air spring, but also permits the rapid expulsion of air from within the primary air spring.

This is accomplished by maintaining the valve plate in air pressure sealing engagement with the relatively large exhaust port of the primary air spring, as compared with its effective diameter, while permitting rapid displacement of the valve plate away from the exhaust port of the primary air spring, as desired. A check valve is slidably disposed in the secondary air spring in the direction of its axial movement. The check valve is biased against the force of the pressurized air within the primary air spring which permits the air spring to be loaded through the check valve to an air pressure which is a function of the force biasing the check valve. A valve plate spring, in conjunction with air pressure within the secondary air spring, biases a valve plate against the exhaust port with a force which at least equals the force provided by the pressurized air within the primary air spring against the outer surface of the valve plate.

When it is desired to collapse the primary air spring, the pressure within the secondary air spring is released and the air within the secondary air spring is relatively quickly exhausted due to the relatively small volume of air, compared with the primary air spring, in the secondary air spring. This, in turn, reduces the force acting on the inner side of the valve plate such that the force provided by the pressurized air within the primary air spring becomes greater than the combined force of the pressurized air and valve plate spring within the secondary air spring, and the valve plate moves away from the exhaust port in the primary air spring.

Air is quickly exhausted through the exhaust port and the primary air spring quickly retracts to provide the desired results.

Accordingly, it is an object of this invention to provide a primary air spring having quick pressure release capability.

Another object of this invention is to provide a relatively large primary air spring which can exhaust its volume of compressed air relatively quickly.

A feature of this invention is the use of a secondary air spring to control the air exhaustion from an associated primary air spring.

Another feature, and object, of this invention is the use of a relatively large valve plate to control the exhaust port in an air spring.

An object, feature and advantage of this invention is its capability of quickly shortening the effective stroke of an air spring.

These, and other objects, features and advantages of this invention will become readily apparent to those skilled in the art upon reading the following description of the preferred embodiments in conjunction with the attached drawings.

DETAILED DESCRIPTION OF THE PREFERRED EMBODIMENT

Figure 1:
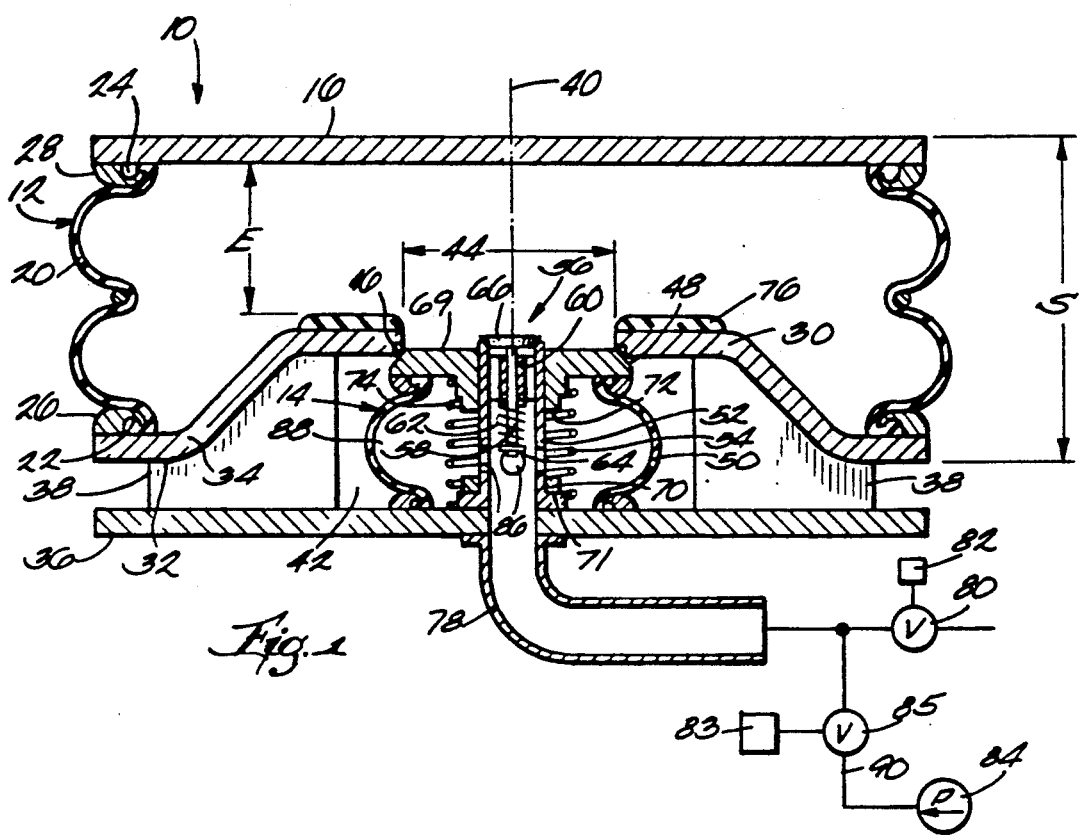
FIG. 1 is a sectional, side-elevational view of the air spring apparatus of this invention showing the primary air spring inflated.

As shown in FIG. 1, an air spring apparatus, generally designated with numeral 10, includes a relatively larger primary air spring 12 and a relatively smaller secondary air spring 14. The primary air spring includes an upper, outer bead plate 16 and a lower, inner bead plate 18 which are disposed generally parallel to one another. Intermediate the inner and outer bead plates in the primary air spring is a convoluted diaphragm 20 made of a flexible material, such as rubber, which is sealed against the inner sides of the inner and outer bead plates 18,16 by means of an annular lip 22,24 of the diaphragm secured in a corresponding flange 26,28 mounted on the inner and outer bead plates.

The inner bead plate 18 has an annular inner portion 30 which is depressed toward the outer bead plate relative to an imaginary plane coincident with the outer surface 32 of an annular outer portion 34 of the inner bead plate 18.

The inner bead plate is spaced above a base plate 36 which is parallel with the outer bead plate 16. Intermediate the inner bead plate and base plate are a plurality of support walls 38 which extend radially outwardly from the longitudinal axis 40 of the air spring apparatus, beginning at a distance from the longitudinal axis 40 so as to define a central cavity 42 about the longitudinal axis and between the inner bead plate 18 and base plate 36. Support walls also extend substantially perpendicular between the inner bead plate and base plate to fixedly position them from each other.

A circular opening forming an exhaust port 44 is centrally located in the inner bead plate 18 about the longitudinal axis 40. A seal 46 extends around the lower peripheral edge of the inner bead plate.

Disposed within the cavity 42 is a secondary air spring, generally designated by numeral 14, which includes an upper valve plate 48, a convoluted diaphragm 50 of a resilient material, such as rubber, a centrally disposed, hollow guide tube 52 which extends between the base plate 36 upwardly through a center opening in the valve plate 48. A valve plate spring 54 biases the valve plate outwardly relative to the base of the guide tube on the base plate.

Within the hollow guide tube, which preferably takes the form of a hollow cylinder in cross-section, is a check valve 56. The check valve includes a stem portion 58 which is slidably mounted within a sleeve portion 60 of the guide tube so as to be capable of reciprocating along an axis parallel to, and preferable coincident with, longitudinal axis 40. A spring 62, which extends between the sleeve 60 and a shoulder 64 on the lower end of the stem 58, biases the check valve downwardly in the guide tube such that the disk-like head 66 of the check valve seats against the annular end of the guide tube which extends from the outer face 69 of the valve plate. A small orifice 67 extends through head 66.

Within the secondary air spring 14 is a bumper 70 which is shown annularly disposed about a lower shoulder 71 on the guide tube. This bumper 70 is arranged to be opposed to a corresponding shoulder 72 on a lower collar portion 74 of the valve plate so as to resiliently halt over-travel of the valve plate in its sliding travel on the guide tube.

Similarly, a bumper 76, which preferable takes the form of an annular ring, extends between the inner surface of the inner portion 30 inner bead plate 18 so as to resiliently halt over-travel of the inner and outer bead plates towards one another.

On the other side of base plate 36 from the secondary air spring 14, an air tube 78 is in fluid communication with the interior of guide tube 52. A valve 80, which can be quickly opened and closed by a solenoid 82 is disposed between the air tube 78 and the atmosphere. An air pump 84 is also linked to the air tube between the air spring apparatus and valve 80. Within the guide tube is a plurality of orifices 86 which permit fluid communication between the air tube 78 and the interior 88 of the secondary air spring.

Figure 2:
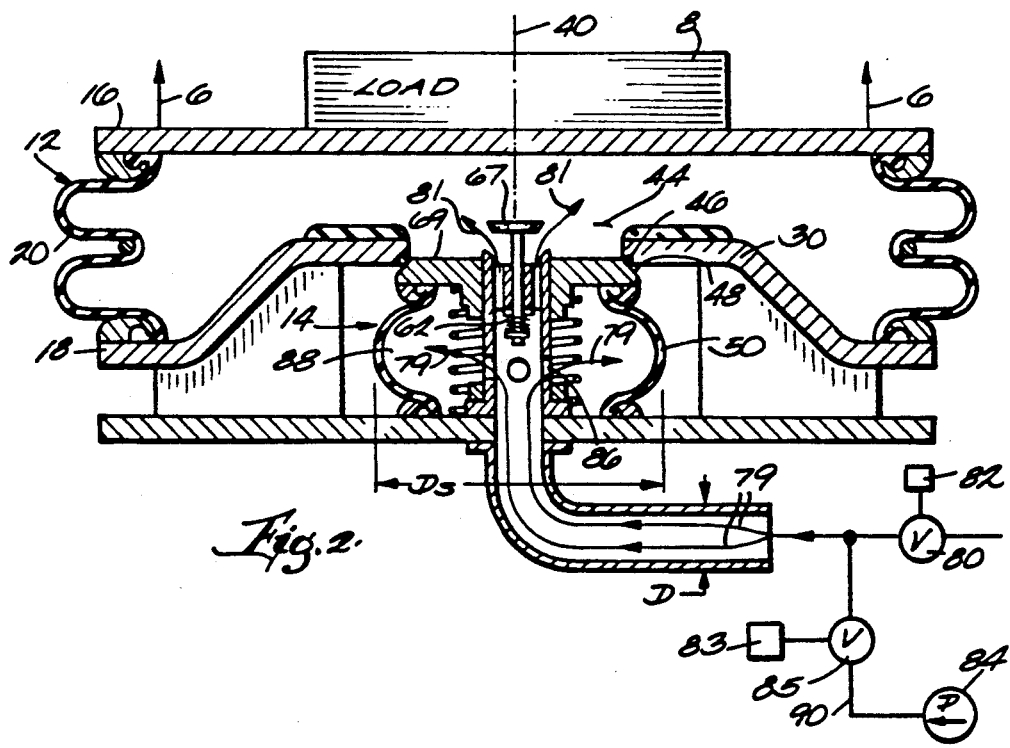
FIG. 2 is a sectional, side-elevational view of the apparatus of this invention showing the check valve in the secondary air spring open and air being introduced into the collapsed primary air spring.
Figure 3:
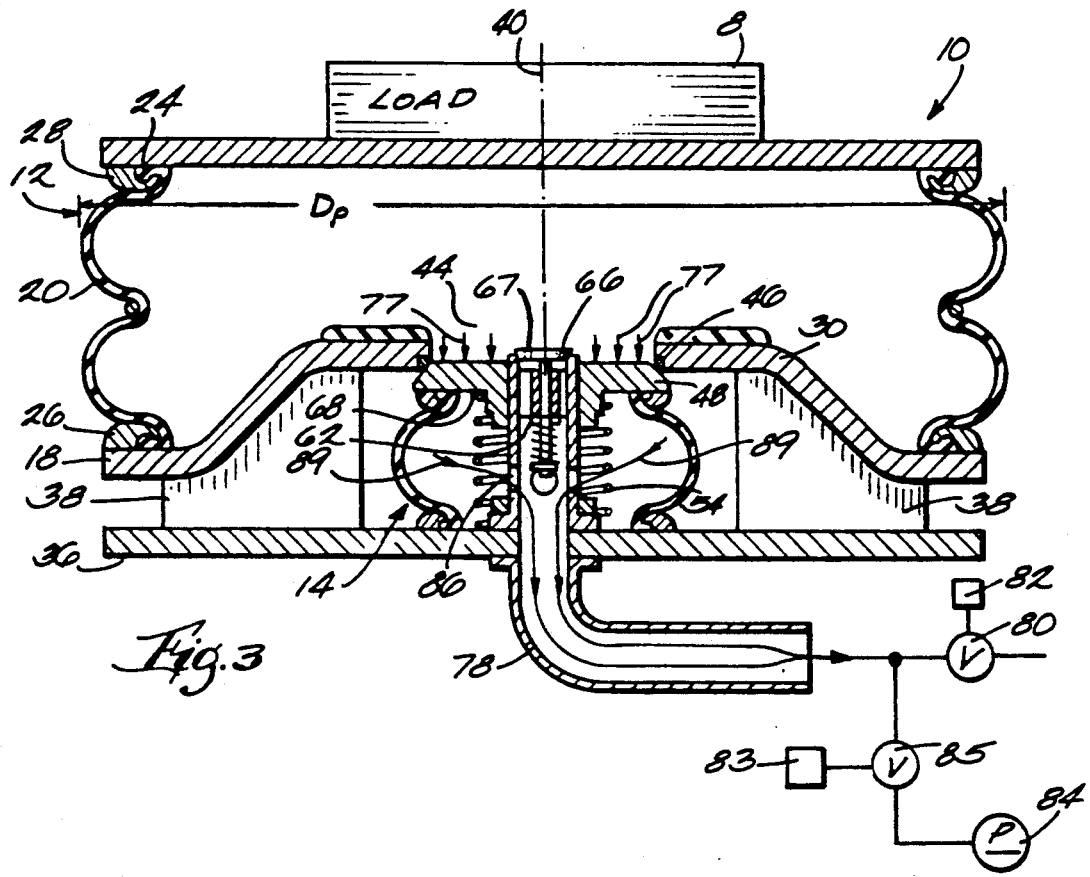
FIG. 3 is a sectional, side-elevational view of the apparatus of this invention showing the air being released from the secondary air spring prior to the collapse, under pressure, of the valve plate to open the exhaust port in the primary air spring.
Figure 4:
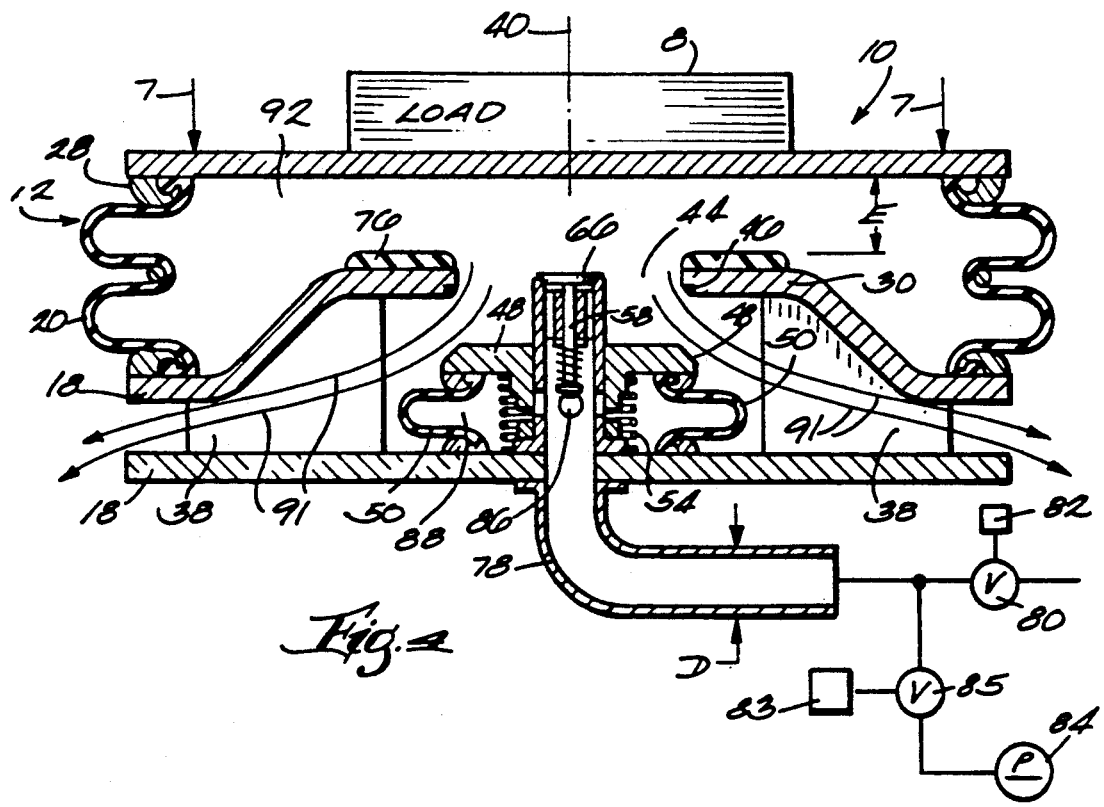
FIG. 4 is a sectional, side-elevational view of the apparatus of this invention showing the primary air spring collapsing under the force of an external load.

In operation, with reference to FIGS. 2-4, to actuate the air spring apparatus 10, to raise the load 8 in the direction of arrows 6, or to apply force to the end of a pivoted arm (not shown), valve 80 is closed, solenoid 83 opens valve 85, and pressurized air is introduced into tube 78 in the direction of arrows 79 (FIG. 2) by air pump 84 via line 90. The air flows through orifices 86 into the interior 88 of secondary air spring 14 and also pushes the head 66 of the check valve upwardly against the biasing force of spring 62 to introduce air into the primary air spring 12. The air pressure within the secondary air spring 14 pushes the valve plate 48 upwardly and outwardly against the annular seal 46 in the exhaust port opening 44 within the inner bead plate 18. This is due to the fact that the smaller secondary air spring 14 becomes pressurized sooner than the relatively larger primary air spring 12 whereby the force acting on the inner side 68 of the valve plate exceeds the force acting on the outer side 69 of the valve plate exposed to the interior of the primary air spring. The air pressure on the inner side of the check valve head 66 also exceeds the air pressure on the outer side of the head, so the check valve is moved upwardly into the primary air spring to allow air to enter the primary air spring (FIG. 2). Air continues to enter the primary air spring through the opening beneath the extended head of the check valve, as shown by arrows 81, until the desired operating pressure within the primary air spring is reached. When the air pressure within the primary air spring is slightly less than the air pressure within the air inlet tube beneath the check valve head 66, the check valve will close under the biasing force of spring 62. Thereafter, subsequent pressure equalization air flow will be maintained through the check valve orifice 67. The orifice 67 through head 66 in the check valve is so small that it does not affect upward movement of the head into the primary air spring during actuation, but it will function to equalize air pressure on both sides of head 66 when the check valve 56 is closed. When the outer bead plate 16 has been extended for the desired maximum stroke height S, the air pressure within the primary air spring closes the check valve, as shown in FIG. 1.

Since the effective area on the inner side of the valve plate within the secondary air spring 14 is larger than the effective area on the outer side of the valve plate exposed to the interior of the primary air spring, the force due to the pressurized air acting on the lower side of the valve plate is greater than the force acting on the upper side of the valve plate so the valve plate remains sealed against the exhaust port 44 (FIG. 1).

When it is desired to release the load support (FIG. 3), or de-actuate the force provided by the air spring apparatus against a pivot arm, the effective stroke E in the direction of the longitudinal axis 40, which is the distance along axis 40 between the top of bumper 76 and the inner surface of the outer bead plate 16, is quickly shortened by the following procedure. First, valve 80 is quickly opened by solenoid 82. Air pump 84 is off and solenoid 83 has closed valve 85. Air flows from the interior cavity 88 of the secondary air spring into the tube 78 through the guide tube orifices 86 in the direction of arrows 89. Since the volumetric flow capacity of the tube 78, as represented by its diameter D, is relatively large compared to the capacity of the secondary air spring, as represented by diameter $D_s$ of its diaphragm 50, the air pressure within the secondary air spring is released almost instantly and the air volume within the secondary air spring is quickly exhausted through the orifices 86 and air tube 78. Just as quickly, this creates a pressure, and force, imbalance on either side of the valve plate 48. The pressurized air within the primary air spring 12, represented by arrows 77, pushes the valve plate downwardly and away from the exhaust port opening 44, as shown in FIG. 4, and the force of the load 8 on the outer bead plate 16 quickly urges the air volume within the primary air spring interior cavity 92 out of the exhaust port 44, which has a relatively large opening relative to the capacity of the primary air spring, as represented by diameter $D_p$ (FIG. 3) of its diaphragm 20. The air flow exhausted from the primary air spring 12 is represented by arrows 91. The primary air spring quickly shortens its stroke in the direction of arrows 7.

Thus, an air spring apparatus has been shown and described which incorporates the features and advantages, and attains the objectives, set forth. The scope of the invention is not intended to be limited by the specific language used to describe the exemplary preferred embodiment, but instead is only limited by the scope of the appended claims. Thus, variations in actuating the air spring apparatus by creating a pressure differential across the valve plate, such as by forming orifices in the valve plate, are contemplated and intended to be within the scope of the claims.

What is claimed is:

1. Air spring apparatus, having a quick release of air pressure and volume to quickly shorten its effective stroke, comprising, in combination:

a primary air spring having inner and outer bead plates and an exhaust port in the inner bead plate;

a base plate;

a secondary air spring disposed between the base plate and the inner bead plate and having a valve plate for moving into, and out of, sealing engagement with the exhaust port;

air flow control means, including a guide tube, for selectively 1) controlling the flow of pressurized air into the primary and secondary air springs to inflate the primary air spring and raise it to a predetermined height and to inflate the secondary air spring and provide a pressure force to move the valve plate to seal the exhaust port to maintain air pressure within the primary air spring, and 2) controlling the glow of exhaust air out of the secondary air spring to decrease the pressure force on the valve plate to thereby cause the release of the valve plate from the exhaust port and permit the rapid decrease in air pressure within the primary air spring and rapid exhaustion of air therefrom to quickly shorten the effective stroke of the air spring apparatus;

one or more orifices in the guide tube for establishing air communication between the guide tube and interior of the secondary air spring;

the air flow control means includes a check valve having the guide tube extending between the base plate and the valve plate and defining a passageway for the flow of air between the primary and secondary air springs and the exterior of the air spring apparatus;

the check valve includes a stem and a head, the stem disposed between the guide tube and resiliently biased to urge the head into sealing engagement with an end of the tube extending through the valve plate against the force of pressurized air within the guide tube when the air pressure in the primary air spring reaches a predetermined level.

2. Air spring apparatus having a quick release of air pressure and volume to quickly shorten its effective stroke, comprising, in combination:

a primary air spring having inner and outer bead plates and an exhaust port in the inner bead plate;

a base plate;

a secondary air spring disposed between the base plate and the inner bead plate and having a valve plate for moving into, and out of, sealing engagement with the exhaust port;

air flow control means, including a guide tube, for selectively 1) controlling the flow of pressurized air into the primary and secondary air springs to inflate the primary air spring and raise it to a predetermined height and to inflate the secondary air spring and provide a pressure force to move the valve plate to seal the exhaust port to maintain air pressure within the primary air spring, and 2) controlling the flow of exhaust air out of the secondary air spring to decrease the pressure force on the valve plate to thereby cause the release of the valve plate from the exhaust port and permit the rapid decrease in air pressure within the primary air spring and rapid exhaustion of air therefrom to quickly shorten the effective stroke of the air spring apparatus;

one or more orifices in the guide tube for establishing air communication between the guide tube and interior of the secondary air spring;

the air flow control means includes a check valve having the guide tube extending between the base plate and the valve plate and defining a passageway for the flow of air between the primary and secondary air springs and the exterior of the air spring apparatus;

the check valve includes a stem and a head, the stem disposed between the guide tube and resiliently biased to urge the head into sealing engagement with an end of the tube extending through the valve plate against the force of pressurized air within the guide tube when the air pressure in the primary air spring reaches a predetermined level;

the head contains an orifice therethrough which does not prevent the head from being extended from the valve plate by the force of pressurized air in the guide tube and entering the primary air spring past the extended head.

3. Air spring apparatus, having a quick release of air pressure and volume to quickly shorten its effective stroke, comprising, in combination:

a primary air spring having inner and outer bead plates and an exhaust port in the inner bead plate;

a base plate;

a secondary air spring disposed between the base plate and the inner bead plate and having a valve plate for moving into, and out of, sealing engagement with the exhaust port;

air flow control means for selectively 1) controlling the flow of pressurized air into the primary and secondary air springs to inflate the primary air spring and raise it to a predetermined height and to inflate the secondary air spring and provide a pressure force to move the valve plate to seal the exhaust port to maintain air pressure within the primary air spring, and 2) controlling the flow of exhaust air out of the secondary air spring to decrease the pressure force on the valve plate to thereby cause the release of the valve plate from the exhaust port and permit the rapid decrease in air pressure within the primary air spring and rapid exhaustion of air therefrom to quickly shorten the effective stroke of the air spring apparatus;

the air flow control means includes a spring disposed to bias the valve plate upwardly toward the exhaust port.

4. Air spring apparatus, having a quick release of air pressure and volume to quickly shorten its effective stroke, comprising, in combination:

a primary air spring having inner and outer bead plates and an exhaust port in the inner bead plate;

a base plate;

a secondary air spring disposed between the base plate and the inner bead plate and having a valve plate for moving into, and out of, sealing engagement with the exhaust port;

air flow control means including,
   a) a guide tube extending between the outside of the secondary air spring and through the valve plate, and further including one or more orifices for linking the interior of the secondary air spring with the guide tube, whereby pressurized air from a source outside the air spring apparatus can be introduced into the primary and secondary air springs,
   b) a stem having a head disposed within the guide tube, and resiliently biased to urge the head into sealing engagement against an end of the tube extending through the valve plate,
   c) an orifice within the head for equalizing the air pressure between the primary and secondary air springs;

whereby pressurized air can enter the guide tube and extend the head against its biasing force to enter and inflate the primary air spring to a predetermined pressure whereupon the head seals against the guide tube, the valve plate seals against the primary air spring and the orifice equalizes pressure within the primary and secondary air springs, and whereby the release of pressurized air from the secondary air spring creates a quick air pressure differential on either side of the valve plate to cause the valve plate to release from the exhaust port to permit rapid exhaustion of air from the primary air spring and corresponding rapid shortening of its effective stroke.

5. Air spring apparatus as set forth in claim 4, wherein:

the secondary air spring is relatively smaller than the primary air spring.

* * * * *